June 21, 1966 P. J. TAMMINEN 3,257,241
GALVANIC BATTERY
Filed Sept. 25, 1961 2 Sheets-Sheet 1

INVENTOR.
PENTTI JUUSE TAMMINEN

BY *Albert M. Parker*

ATTORNEY.

June 21, 1966　　　P. J. TAMMINEN　　　3,257,241
GALVANIC BATTERY
Filed Sept. 25, 1961　　　　　　　　　　2 Sheets-Sheet 2
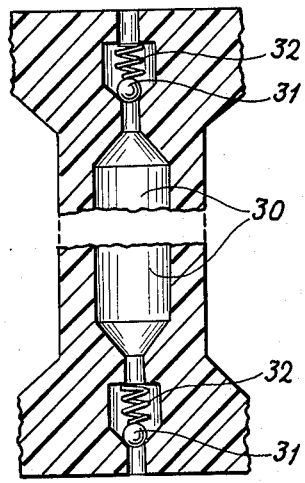
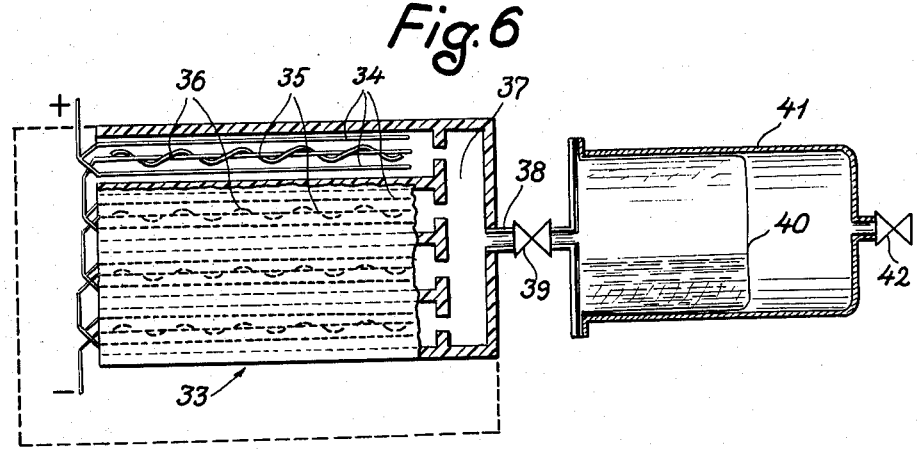
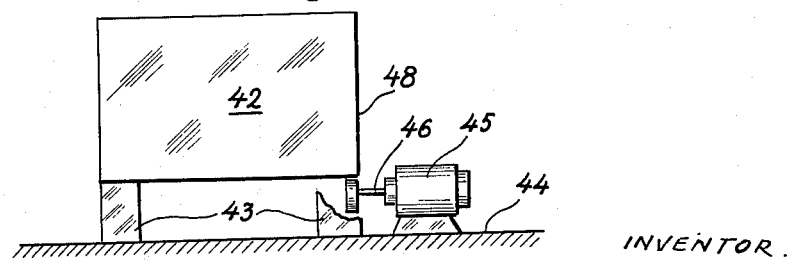
INVENTOR.
PENTTI JUUSE TAMMINEN
BY Albert M. Parker
ATTORNEY.

United States Patent Office 3,257,241
Patented June 21, 1966

3,257,241
GALVANIC BATTERY
Pentti Juuse Tamminen, Otakallio, Otaniemi, Finland
Filed Sept. 25, 1961, Ser. No. 140,384
Claims priority, application Finland, Apr. 24, 1961, 795/61
3 Claims. (Cl. 136—90)

This invention relates to galvanic batteries.

For many purposes in modern techniques there is a need for galvanic batteries which have a high ratio of power output to weight and size and are able to discharge their total capacity without substantial voltage fail-off even at high rates. Common battery types are not suitable for such purposes because it is not possible to utilize more than a fraction of their energy capacity by discharging them a short time with maximum effect.

One popular application for such use is a silver-zinc battery with plate electrodes, insulated from each other by porous separator sheets. The reaction takes place through the mediation of electrolyte liquid, which fills the pores in the separators. The maximum current and effect obtained from the battery depends decisively on the diffusion of ions in this liquid.

The diffusion speeds of ions in liquids are known to be very small. Therefore the electrode plates in silver-zinc batteries are made to have a large surface and the distances between the plates are arranged to be as small as possible. The ion concentrations of the electrolyte liquid are also adjusted to allow maximum speed for ion diffusion. As a result a fairly effective battery has been developed.

Another method of increasing the output of a battery is improving the ion diffusion by applying electrolyte flow. The phenomenon can be compared with the effect of ventilation to improve evaporation, e.g. when drying laundry. The effect of the electrolyte flow is two-fold: it transports to the electrodes ions taking actively part in the reactions, and it also carries away the reaction products, thus preventing the forming of a passivating layer on the electrode surfaces. The last mentioned effect is of great importance e.g. in batteries using $CrO_3$ or $KMnO_4$ as a depolarizer.

In a silver-zinc battery, in which the electrolyte is absorbed in the pores of the separators, it is not possible to produce any effective electrolyte flow. In some other known battery systems as described e.g. in U.S. patent specification No. 1,258,265 it has been proposed to improve the efficiency of a battery by forcibly circulating the electrolyte liquid past the electrodes. In this battery, however, porous sheet material has been applied around the electrodes, thereby slowing the ion diffusion in the vicinity of the electrodes. Thus, prior attempts to utilize the advantages of the electrolyte circulation have not been successful.

It is therefore an object of the present invention to provide a galvanic battery wherein means are included for causing a rapid, turbulent electrolyte flow along the surface of the electrodes.

A further object of the invention is to provide a galvanic battery wherein the electrodes are shaped and arranged with respect to each other, and a turbulent flow of electrolyte is created with respect to said electrodes, in such a manner that the efficiency of the battery is materially increased.

A still further object of the invention is to provide a galvanic battery wherein the means for causing the flow of electrolyte are powered by the battery itself. By applying the principles of turbulent electrolyte flow of the present invention to a chromic-acid battery it is possible to produce an additional output many times greater than the power needed to generate said flow. To demonstrate this surprising effect it may be mentioned by way of example that, in a battery whose space and weight is increased by about 5% by the provision of an impeller and an electric drive motor therefor to produce electrolyte flow in accordance with the invention, the energy delivered by the battery in a short-time discharge is increased up to 100% or even more. The fraction of the battery output consumed by the motor is negligible compared with the total output of the battery, i.e. only about 0.3%.

In addition to yielding an increased output, the electrolyte flow of the invention also increases the capacity of the battery by intensifying the utilization of the depolarizing material and by reducing the internal resistance of the battery, delaying thus the voltage drop during the discharge. An effective electrolyte circulation will also enable use of highly concentrated electrolytes, thus increasing the capacity of the battery.

The invention is described in the following with reference to the accompanying drawing.

In the drawing:

FIG. 5 shows a detail of another embodiment of the invention;

FIG. 6 is a sectional view showing schematically still another embodiment of the invention; and FIG. 7 shows schematically a further embodiment of the invention.

Figure 1:
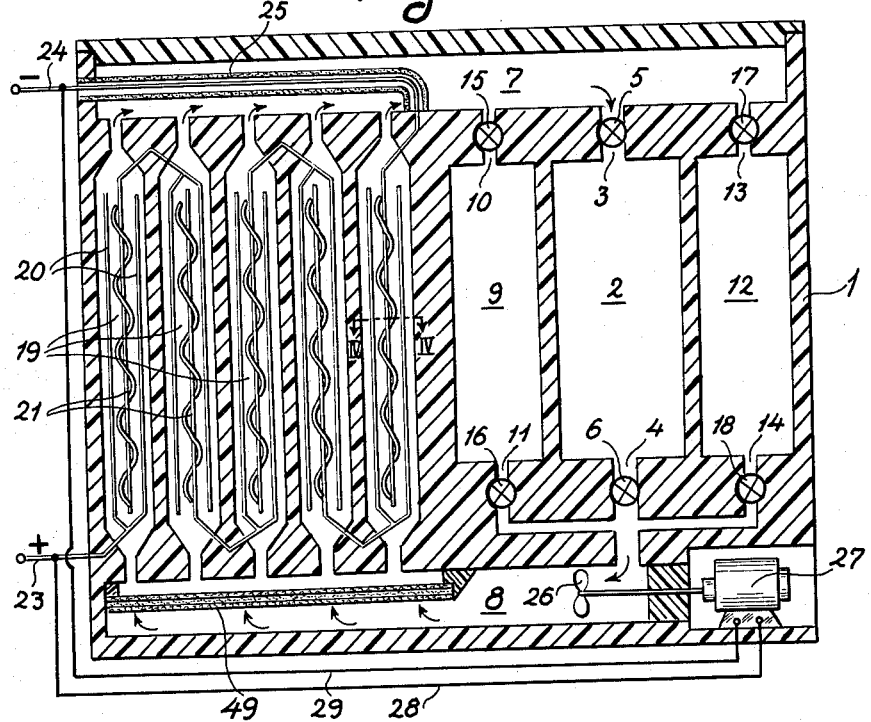
FIG. 1 shows a schematic sectional view of a battery according to an embodiment of the invention.

The embodiment shown in FIGS. 1–4 comprises a casing 1 of any suitable material having formed therein a container 2 connected by ports 3 and 4 to channels 7 and 8 respectively. A valve 5 is provided in port 3 and a valve 6 in port 4.

In the opposite end of casing 1 there are formed a number of cells 19 opening at both ends thereof through narrow openings into the channels 7 and 8 respectively. In each of the cells 19 there are provided positive and negative electrodes 20 and 21, respectively, separated from each other by means of helically extending separators 22 of any suitable insulating material, the electrodes of the cells being coupled in series and connected to the terminals 23 and 24 of the battery. The lead connecting the last negative electrode to terminal 24 is protected by a tube 25 of insulating material.

Figure 2:
FIG. 2 is an enlarged partly sectional view of a positive electrode of the battery of FIG. 1.
Figure 3:
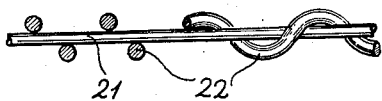
FIG. 3 is an enlarged partly sectional view of a negative electrode of the battery of FIG. 1.

As shown in FIG. 2, a positive electrode 20 comprises a core 50 of e.g. copper wire coated with a layer 51 of plastic material which has been made conductive by incorporating in it small particles of carbonaceous material, such as graphite and acetylene black. A negative electrode, which consists of a zinc wire 21 surrounded by the separator 22 wound helically thereararound, is shown in FIG. 3. It will be noted from this figure that the pitch of the helically wound separator member 28 substantially exceeds the width of that member as measured in the longitudinal direction of wires 20, 21.

Figure 4:
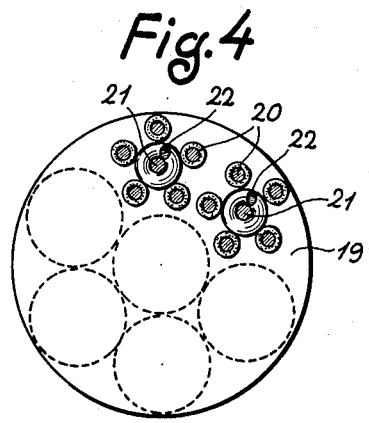
FIG. 4 is a plan view with parts taken in section along line IV—IV of FIG. 1.

For the sake of clarity each cell 19 in FIG. 1 is shown to be provided with only two positive electrodes 20 and one negative electrode 21. According to a more specific feature of the invention, however, it is preferred to provide a plurality of electrodes in each cell in a manner illustrated in FIG. 4. As seen in FIG. 4, several positive electrodes 20 are grouped around one negative electrode 21 with interposition of the separator 22. A plurality of such electrode groups are provided in the cell so that the space of the cell is practically filled with electrodes, leaving only narrow passages therebetween, and the total surface area of the positive electrodes is considerably greater than the total surface area of the negative electrodes. The shown arrangement of the electrodes will materially reduce the internal resistance of the battery.

For the generation of the flow of electrolyte in accordance with the invention a propeller pump 26 driven by an electric motor 27 is provided in channel 8. The motor 27 is coupled to the terminals 23 and 24 of the battery as indicated by leads 28 and 29.

The electrolyte is a mixture of chromic acid, sulphuric acid and water. Before activation this electrolyte mixture is enclosed within container 2, valves 5 and 6 being closed. The remaining space of the casing, i.e. the cells 19 and channels 7 and 8, may be empty or filled with an inert liquid, such as distilled water.

To place the battery in operation a source of external voltage (not shown) is connected to the motor 27, and valves 3, 4 are opened. Propellor pump 26 generates then a rapid flow of electrolyte in the direction indicated by arrows, and the helically extending separators 22 cause the flow to turn turbulent. In the battery shown the cells are in short circuit via the narrow ends of the cells, but the leakage current is vanishingly small compared with the output current of the battery, and when the rate of flow exceeds a certain limit no leakage current can be noticed.

The external voltage is needed just for a short period to start the flow of electrolyte; thereafter the motor 27 will run by the battery's own power.

During discharge the electrolyte will slowly lose its activity. In order to keep the voltage stable, means may be included for replenishing the consumed electrolyte. In the embodiment of FIG. 1 these means are shown to comprise two additional containers 9 and 12, container 9 being connected by ports 10 and 11 to channel 7 and port 4 respectively, and container 12 being connected by ports 13 and 14 to channel 7 and port 4 respectively. Ports 10, 11, 13 and 14 are provided with valves 15, 16, 17 and 18 respectively. One of the containers 9 and 12 is filled with a concentrated chromic-acid solution and the other with concentrated sulphuric acid. Upon opening of the valves 15, 16, 17 and 18, which may be made right at the start of operation or later on, sulphuric acid and chromic acid from containers 9 and 12 will be added to the circulating electrolyte. By proper dimensioning of ports 10, 11, 13 and 14 and/or valves 15, 16, 17 and 18 it is possible to obtain an addition of sulphuric acid and chromic acid in substantially the same proportion as they are consumed in the reaction. In this manner the voltage of the battery will keep stable over fairly extended discharge periods.

A filter, as indicated at 49 in FIG. 1, may also be included in the embodiment shown for the removal of possible solid particles from the electrolyte. In order to compensate loss of active electrolyte material during the reaction it is also possible to include electrolyte-activating material in the filter, e.g. crystalline $CrO_3$ and $SO_3$ placed between layers of glass fiber forming the filter.

Another effective way of compensating the loss of reactivity of the electrolyte as the reaction proceeds is gradually to increase the speed of flow. This may be arranged by means of an adjustable resistance which is adapted slowly to raise the voltage of the motor, being actuated by the rotation of the propeller shaft through the intermediary of a suitable gear.

It has been discovered that an elevated temperature between 50° C. and 80° C. is favorable for the efficiency of a chromic-acid battery. Since the heat evolution may be rather strong in a battery it may be advantageous to include cooling means in the circulation system in order to keep the temperature within the desired limits. If, on the other hand, the battery is intended for use under low-temperature conditions it will be desirable to provide means for heating of the electrolyte liquid in order instantly to obtain the full effect of the battery. Such heating may be carried out in a convenient manner by modifying the embodiment shown in FIG. 1 so that instead of the container 2 two containers are provided, one for concentrated sulphuric acid and the other for highly diluted chromic acid. The mixing together of said liquids for activation of the battery will cause a rapid rise of temperature of the electrolyte to a value within the above limits.

When applying the invention to storage batteries—and also in primary batteries intended for periodically repeated use—it is preferred to close the open ends of the cells by means of valves in order to avoid leakage currents during the idle periods. Such a construction is illustrated by way of example in FIG. 5. In that figure, numeral 30 designates a cell which may be similar to the cells shown in the embodiment of FIG. 1. In each end of the cell 30 there is provided a valve formed by a spring-loaded ball 31. The spring 32 is so dimensioned that the ball 31 will open against the action of the spring in response to a predetermined pressure of electrolyte liquid caused by the pump, and close automatically when said pressure ceases.

Batteries intended for a very short discharge period may be designed in such a way that the electrolyte is not circulated through the cells but just caused to flow once through the cells and to be then discarded. FIG. 6 illustrates such an embodiment of the invention. Numeral 33 designates a plurality of elongated cells having a small cross-sectional area and containing electrodes 34 and 35. The electrodes may be of the same type as shown in the embodiment of FIG. 1, being thus separated from each other by helical separators 36. The cells 33 are open at one end, the opposite ends thereof being connected to a common manifold 37 which in its turn is connected by a duct 38, provided with a valve 39, to a container 40 for electrolyte liquid. The container 40 is made of flexible or collapsible material and arranged within a rigid container 41 filled with a pressure medium, such as a gas. A valve for admitting this pressure medium into container 41 is indicated at 42.

When placing the battery shown in FIG. 6 in operation, valve 39 is opened, whereby the pressure medium in container 41 will compress the collapsible container 40 and thereby force the electrolyte to flow through duct 38 and distributor pipe 37 and further in a turbulent flow through each of the cells 33 to escape through the open ends thereof.

In a battery of this type it is advantageous to use a highly active electrolyte whose speed of flow may be reduced by adjusting valve 39 so that the discharge period is prolonged.

It has been discovered that vibration has a favorable effect on the efficiency of the battery. This fact is believed to be due to the phenomenon that vibration causes turbulence adjacent the surface of the electrodes. To make use of this phenomenon the motor 27 of the embodiment shown in FIG. 1 may be given a slightly eccentric construction so as to cause vibration when running. In some cases, especially in batteries intended for very short discharge periods, it is possible to use only vibration and to omit the circulation system since the turbulence caused by the vibration alone will increase the activity of the battery to a sufficient degree. FIG. 7 illustrates schematically such an embodiment of the invention. A battery generally indicated at 42 is supported by pads 43 of an elastic material, such as rubber, these pads being secured to the battery and to a suitable base member 44. The base member 44 further carries an electric motor 45 whose shaft is provided with a cam plate 46 engaging the casing 48 of battery 42. When the rotor 45 rotates, the cam plate 46 will cause the whole battery to vibrate.

The invention may of course also be applied to battery types other than those being chromic acid. Furthermore, it may in some cases be necessary to divide the cells by a diaphragm and arrange two parallel, separate circulation systems. A so-called Bunsen battery may be mentioned as an example of a battery having a diaphragm. In a Bunsen battery constructed in accordance with the invention, one circulation system would include sulphuric acid and zinc electrodes, and the other circulation system would include nitric acid and carbon electrodes. Both the positive and negative electrodes may in that case be provided with helical separators to cause a turbulent flow of electrolyte.

Depending upon the type of battery it is also possible to use an electrolyte comprising finely divided particles of a depolarizing material, such as manganese-dioxide crystals, and of a conductive material, such as graphite, in order to enlarge the active depolarizing surface. In this case no filter is used, of course, and the pump must be selected so as to be capable of handling the mud-like mixture.

It is to be understood that the embodiments of the invention shown and described are to be interpreted in an illustrative and not in a limiting sense, and that various modifications thereof are possible within the scope of the appended claims. One obvious modification, to mention an example, would be to construct the cells of the battery as one unit and the electrolyte container or containers as one or several other units, these units being connected by suitable ducts.

What I claim is:

1. A galvanic battery, comprising:
   housing means forming at least one electrode chamber and at least one electrolyte reservoir communicating therewith;
   first and second spacedly juxtaposed relatively fixed electrode means of opposite polarity disposed within said chamber, said electrode means having confronting active surfaces;
   means in said housing means forming a substantially closed electrolyte-circulation path from said reservoir to said chamber, between said surfaces within said chamber and from said chamber back to said reservoir;
   means for effecting circulation of a stream of electrolyte through said chamber along said surfaces; and
   electrolyte-deflecting separator means interposed between said electrode means and projecting transversely from said surfaces in contact with both said electrode means for maintaining a spacing therebetween and constraining the electrolyte to change direction repeatedly in streaming through said chamber, said first electrode means being a substantially straight central wrie and said second electrode means comprising an array of oppositely poled angularly spaced counterelectrodes substantially straight wires parallel to said central wire, said electrolyte-deflecting separator means comprising an elongated nonconductive member helically wound around said central wire with a pitch substantially in excess of the width of the member in longitudinal direction of said wires.

2. A battery as defined in claim 1 wherein the wires of said array are electrically connected in parallel.

3. A battery as defined in claim 1, further comprising means for reciprocating said wires in the longitudinal direction.

References Cited by the Examiner

UNITED STATES PATENTS

| 248,654 | 10/1881 | Jablochkoff | 136—74 |
| 606,526 | 6/1898 | Epstein. | |
| 734,549 | 7/1903 | Halsey | 136—160 |
| 1,447,657 | 3/1923 | Gouin et al. | |
| 2,921,111 | 1/1960 | Crowley et al. | 136—160 |
| 2,936,327 | 5/1960 | Schrodt et al. | 136—162 |

FOREIGN PATENTS

| 15,257 | 1893 | Great Britain. |
| 18,886 | 1906 | Great Britain. |

ALLEN B. CURTIS, *Primary Examiner.*

JOHN R. SPECK, JOHN H. MACK, WINSTON A. DOUGLAS, S. PARKER, D. L. WALTON,
*Assistant Examiners.*